(12) United States Patent
Proebstle et al.

(10) Patent No.: US 10,106,108 B2
(45) Date of Patent: Oct. 23, 2018

(54) VEHICLE ELECTRICAL SYSTEM

(71) Applicant: Bayerische Motoren Werke Aktiengesellschaft, Munich (DE)

(72) Inventors: Hartmut Proebstle, Wuerzburg (DE); Alfons Brunner, Woerth a. d. Isar (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 453 days.

(21) Appl. No.: 14/865,519

(22) Filed: Sep. 25, 2015

(65) Prior Publication Data

US 2016/0107589 A1    Apr. 21, 2016

Related U.S. Application Data

(63) Continuation of application No. PCT/EP2014/056177, filed on Mar. 27, 2014.

(30) Foreign Application Priority Data

Mar. 28, 2013    (DE) .................. 10 2013 205 638

(51) Int. Cl.
*H02J 7/00* (2006.01)
*H02J 1/00* (2006.01)
(Continued)

(52) U.S. Cl.
CPC .............. *B60R 16/03* (2013.01); *B60K 6/28* (2013.01); *B60L 1/00* (2013.01); *B60L 11/1868* (2013.01);
(Continued)

(58) Field of Classification Search
CPC ... B60R 16/03; B60K 6/28; B60L 1/00; B60L 11/1868; B60L 2210/12; B60W 10/26;
(Continued)

(56) References Cited

U.S. PATENT DOCUMENTS

2010/0090529 A1* 4/2010 Yoshida ............... H02J 7/0068
307/31
2014/0354051 A1* 12/2014 Guo ...................... H02J 1/00
307/26
(Continued)

FOREIGN PATENT DOCUMENTS

DE          102 51 589 A1    5/2004
DE      10 2007 001 673 A    7/2008
(Continued)

OTHER PUBLICATIONS

PCT/EP2014/056177, International Search Report dated Dec. 3, 2014 (Two (2) pages).
(Continued)

*Primary Examiner* — Brandon S Cole
(74) *Attorney, Agent, or Firm* — Crowell & Moring LLP

(57) ABSTRACT

A vehicle electrical system includes a first partial electrical system having a first energy store of a first nominal voltage level, a second partial electrical system having a second energy store of a second nominal voltage level, and a DC-DC converter between the two partial electrical systems. The first energy store has a housing, which has at least a first tap for the first nominal voltage level, and by which a first DC-DC converter can be electrically supplied. The housing has at least a second tap for the second nominal voltage level, by which the second energy store can be electrically supplied. The housing further includes a voltage conversion unit, by which the voltage of the first nominal voltage level can be converted into voltage of the second nominal voltage level.

18 Claims, 2 Drawing Sheets

(51) Int. Cl.
| | |
|---|---|
| *H02J 1/12* | (2006.01) |
| *H03M 7/00* | (2006.01) |
| *B60L 11/18* | (2006.01) |
| *B60W 10/04* | (2006.01) |
| *B60R 16/03* | (2006.01) |
| *H02J 1/10* | (2006.01) |
| *B60L 1/00* | (2006.01) |
| *H02M 3/10* | (2006.01) |
| *B60K 6/28* | (2007.10) |
| *B60W 10/26* | (2006.01) |
| *H02J 7/14* | (2006.01) |

(52) U.S. Cl.
CPC ............... *B60W 10/26* (2013.01); *H02J 1/10* (2013.01); *H02J 7/00* (2013.01); *H02J 7/1423* (2013.01); *H02M 3/10* (2013.01); *B60L 2210/12* (2013.01); *Y02T 10/7011* (2013.01); *Y02T 10/7016* (2013.01); *Y02T 10/7022* (2013.01); *Y02T 10/7066* (2013.01); *Y02T 10/7233* (2013.01)

(58) Field of Classification Search
CPC .. H02J 1/10; H02J 1/00; H02J 1/1423; H02M 3/10; Y02T 10/7011; Y02T 10/7016; Y02T 10/7022; Y02T 10/7066; Y02T 10/7233
USPC .................................................. 307/9.1–10.8
See application file for complete search history.

(56) References Cited

U.S. PATENT DOCUMENTS

| | | | | |
|---|---|---|---|---|
| 2015/0076911 | A1* | 3/2015 | Pape ......................... | H02J 1/12 307/52 |
| 2015/0280466 | A1* | 10/2015 | Owen ................... | H02J 7/0021 320/107 |
| 2015/0295442 | A1* | 10/2015 | Seymour ............... | H02J 7/0052 320/116 |
| 2016/0200202 | A1* | 7/2016 | She .......................... | B60L 11/18 307/10.1 |
| 2016/0211679 | A1* | 7/2016 | Rabbers .............. | H01M 10/425 |
| 2017/0162851 | A1* | 6/2017 | Wyatt .................... | H01M 2/206 |

FOREIGN PATENT DOCUMENTS

| | | | |
|---|---|---|---|
| DE | 102007673 A1 * | 7/2008 | ............... H02J 1/08 |
| DE | 10 2009 029 524 A1 | 3/2011 | |
| DE | 10 2010 046 616 A1 | 3/2012 | |
| EP | 2 202 872 A1 | 6/2010 | |
| KR | 10-2012-0109883 A | 10/2012 | |
| WO | WO 2004/042888 A1 | 5/2004 | |
| WO | WO 2011/009673 A1 | 1/2011 | |

OTHER PUBLICATIONS

German Search Report issued in counterpart German Application No. 10 2013 205 638.9 dated Nov. 29, 2013, with Statement of Relevancy (Five (5) pages).

* cited by examiner

VEHICLE ELECTRICAL SYSTEM

CROSS REFERENCE TO RELATED APPLICATIONS

This application is a continuation of PCT International Application No. PCT/EP2014/056177, filed Mar. 27, 2014, which claims priority under 35 U.S.C. § 119 from German Patent Application No. 10 2013 205 638.9, filed Mar. 28, 2013, the entire disclosures of which are herein expressly incorporated by reference.

BACKGROUND AND SUMMARY OF THE INVENTION

The invention relates to a vehicle having an electrical system, which electrical system comprises a first partial electrical system having a first energy store of a first nominal voltage level, a second partial electrical system having a second energy store of a second nominal voltage level and a DC-DC converter between the two partial electrical systems.

In particular, vehicles with an electric drive train usually have a plurality of electrical energy stores in partial electrical systems of varying voltage levels. A DC-DC converter establishes an electrical coupling between the partial electrical systems. This can be seen, for example, from the document WO/2011/009673 A1.

An object of the invention is to describe an improved vehicle having an electrical system, which electrical system comprises a first partial electrical system having a first energy store of a first nominal voltage level, a second partial electrical system having a second energy store of a second nominal voltage level and a DC-DC converter between the two partial electrical systems.

According to one embodiment of the invention, the first energy store comprises a housing which has at least a first tap for the first nominal voltage level, by means of which the first DC-DC converter can be electrically supplied, and at least a second tap for the second nominal voltage level, by means of which the second energy store can be electrically supplied, wherein the at least one first tap and the at least one second tap are galvanically isolated, the housing contains a voltage conversion unit, and electric voltage of the first nominal voltage level can be substantially converted into voltage of the second nominal voltage level by the voltage conversion unit.

For example, the vehicle has a high-voltage store which comprises as an essential component an electrochemical high-voltage battery as a first energy store. The high-voltage store is characterized by a housing closed outwardly therefrom having at least two taps which are accessible from the outside.

It is especially advantageous if the housing has at least one contactor contact, through which a first contactor position can be occupied and a second contactor position can be occupied, in the first contactor position the at least one tap can be switched in a de-energized state, in the second contactor position an electrical voltage drops across the at least first tap, an electrical voltage can be applied by means of the voltage conversion unit in the first contactor position across the at least second tap, and an electrical voltage can be applied by means of the voltage conversion unit in the second contactor position across the at least second tap.

This means that the voltage conversion unit comprises a permanent electrical connection with the high-voltage battery within the housing of the high-voltage store independent from a switch position of the contactor contact. In contrast, the electrical connection between the high-voltage battery and the first tap can be switched by means of the at least one contactor contact.

According to a preferred embodiment of the invention, the second partial electrical system comprises electrical consumers of the second nominal voltage level, and the electrical consumers can be electrically supplied via the second tap.

The voltage conversion unit thus converts electrical power from the voltage level of the high-voltage battery to electrical power of the voltage level of the second energy store, and makes this available at the second tap. The second energy store is suitably designed as a power-optimized energy store, i.e. has a high charge acceptance ability. By means of example, in addition to a secondary store, a supercapacitor unit also comes into consideration here, which can thus be charged from the high-voltage store via the second tap. For charging, electrochemical overpotential can be set by the voltage conversion unit at the supercapacitor unit, in order to charge it. This means that the supplied voltage of the second nominal voltage level exceeds this overpotential. In this context, the voltage conversion unit "substantially" sets the voltage at the second nominal voltage level.

Furthermore, it is useful if the second tap is assigned a comparator circuit, a switch-on signal can be transmitted to the voltage conversion unit via the comparator circuit, and a switch-off signal can be transmitted to the voltage conversion unit via the comparator circuit.

The comparator circuit is assigned a first switching voltage value and a second switching voltage value, so that a voltage dropping across the second tap can be compared with the first switching voltage value and with the second voltage switching value via the comparator circuit.

Via the comparator circuit, the switch-on signal can be transmitted across the second tap in the case of a dropping voltage which is lower than the first switching voltage value, and the switch-off signal can be transmitted across the second tap in the case of a dropping voltage which exceeds the second switching voltage value.

Via the comparator circuit, the voltage conversion unit can thus be switched on and off according to a voltage hysteresis applied to the second tap.

The first nominal voltage level is preferably in a voltage range of 12 volts to 600 volts, and the second nominal voltage level in a voltage range of 12 volts to 60 volts.

It is further useful if the voltage conversion unit has a nominal output power, and the nominal output power substantially corresponds to a typical power requirement of the second partial electrical system in a stationary operation of the vehicle.

The stationary operation of the vehicle is to be distinguished from a driving operation and an idling state of the vehicle. In contrast to stationary operation, dynamic driving maneuvers are performed in the driving operation of the vehicle. This means that a charging operation of the vehicle, in which the high-voltage store is charged, for example by cable at a charging station, represents a sub-case of stationary operation. During driving operation and stationary operation, the vehicle is operationally active. The idling state of the vehicle must here be distinguished, in which the vehicle is not operating.

The invention is based on the considerations set out below:

Vehicles exist which have a plurality of energy stores, such as plug-in hybrid vehicles (PHEV), hybrid vehicles (HEV), electric vehicles (BEV) and vehicles with an engine start-stop function. All of these vehicles have a need for idle current in non-operational states, which generally burdens the energy stores.

In the case of vehicles with an electric drive train, an increased idle current and current in stationary operation are further generated through the charging of a high-voltage energy store. This usually requires a stationary or cyclical recharging of a low-voltage battery via a central DC/DC converter in an inefficient partial load operation thereof.

The need of the vehicle for idle current leads to a strong discharge of a central 12-volt lead-acid battery, which is used, of course, as a low-voltage battery, and which is thereby partially discharged after a stationary phase and idling phase and is thus prematurely aged. Consequently, this lead-acid battery is to be designed correspondingly with premature aging and dimensioned with high capacity.

In electric vehicles, recharging of the lead-acid battery in the stationary and idling phases is generally carried out by the DC/DC converter, which usually has a very poor working efficiency (i.e. <<75%), in the region of <<10 amps, in the currents to be delivered in this operation, and therefore causes high electrical losses. This has a negative effect on charging efficiency and thus also the energy and pollutant balance of the vehicle.

It is proposed to ensure an energy-efficient optimized supply of idling and stationary current in the electrical system to the low-voltage battery by means of a specially mounted, high-efficiency low-voltage tap on the high-voltage store. This is used to recharge the low-voltage battery and to supply the active logic of the control devices of the vehicle.

This has the consequence that in the idling state of the vehicle, in stationary operation and during the charging phase, the lead-acid battery is not discharged and thus can be designed with a weak capacity, i.e. a smaller lead-acid battery can be used than without the tap.

Alternatively, a lithium battery or a supercapacitor can be used. The DC/DC converter is not required to recharge the 12-volt lead-acid battery, and power loss is avoided. Thus, there is an increased electrical efficiency of the vehicle and an improved pollutant balance due to weight-saving and an improved energy efficiency. Furthermore, the probability of failure of the low-voltage battery is effectively suppressed.

The low-voltage tap is realized through a voltage conversion unit. The integration of the voltage conversion unit occurs advantageously within the housing of the high-voltage store, to avoid costly high-voltage cabling outside the store. In terms of circuitry, the input-side terminal of the voltage conversion unit on the high-voltage store is independent of the switching position of a high-voltage contactor or of the high-voltage contactor at the potential of a high-voltage battery of the high-voltage store, i.e. within the pole of the high-voltage battery. The high-voltage contactors or the high-voltage contactor is normally open in stationary operation and in an idling state.

Hereafter will be described with reference to the accompanying drawings an exemplary embodiment of the invention. Further details, preferred embodiments and developments of the invention result therefrom. Individually schematically shown are Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
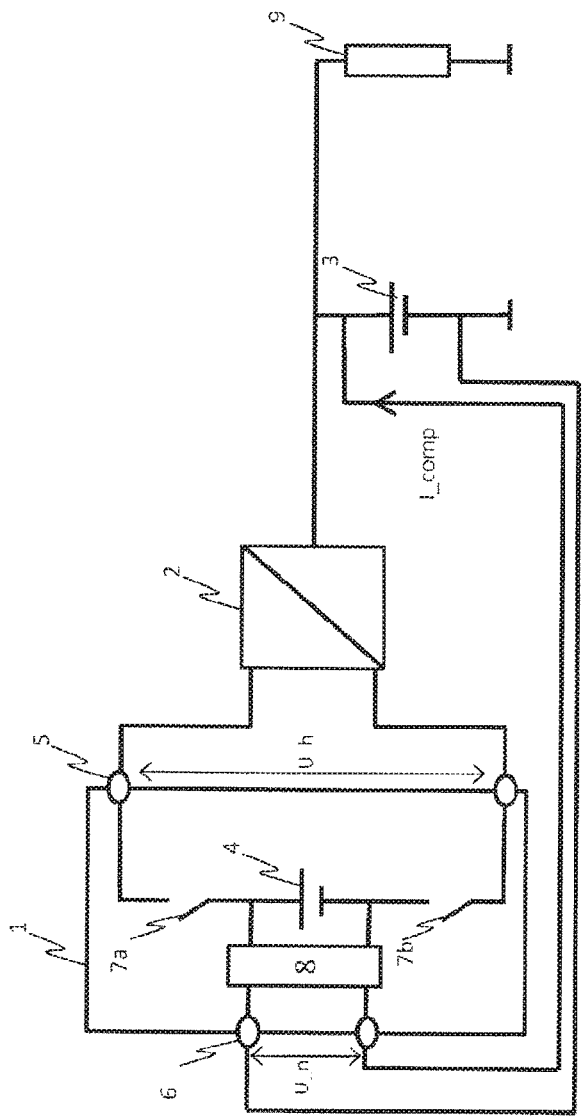
FIG. 1 a schematic section of a vehicle electrical system.

FIG. 1 shows a schematic section of a vehicle electrical system. It comprises a high-voltage store (1) having a housing closing outwardly therefrom. On this housing is located a first tap (5, U_h) and a second tap (6, U_n). At the first tap, a DC-DC converter (2), also referred to as a DC/DC transducer, is connected. On the output side of the DC/DC transducer is located a low-voltage electrical system of the vehicle with a low-voltage store (3) and electrical consumers (9).

The low-voltage store is a power-optimized electrical energy store, and according to this exemplary embodiment is designed by means of example as a supercapacitor with a nominal voltage of 14 volts. The low-voltage store is electrically connected to the second tap of the high-voltage store.

Inside the housing of the high-voltage store is located a high-voltage battery (4), for instance a lithium-ion battery with a nominal voltage of 380 volts, and two contactor contacts (7a, 7b). The contactor contacts can accept two contactor positions, "open" and "closed."

In the case of an open contactor contact (as is shown in FIG. 1), the poles of the high-voltage battery are electrically disengaged from the first tap, i.e. without an electrical connection to the poles of the battery. In the case of a closed contactor contact (not as shown in FIG. 1), the poles of the high-volt battery are electrically connected with the first tap of the high-voltage store.

Inside the housing is also located a voltage conversion unit (8). This is permanently electrically connected to the poles of the high-voltage battery and is electrically supplied by the high-voltage battery. In addition to this electrical input, the voltage conversion unit also has an electrical output that is permanently electrically connected to the second tap.

The voltage conversion unit can uni-directionally convert electrical power from the nominal voltage level of the high-voltage battery to a voltage level which leads to an electrochemical overpotential of the low-voltage battery, in order to be able to charge this (for example 14.4 volt). The charging current is designated as l_comp.

Figure 2:
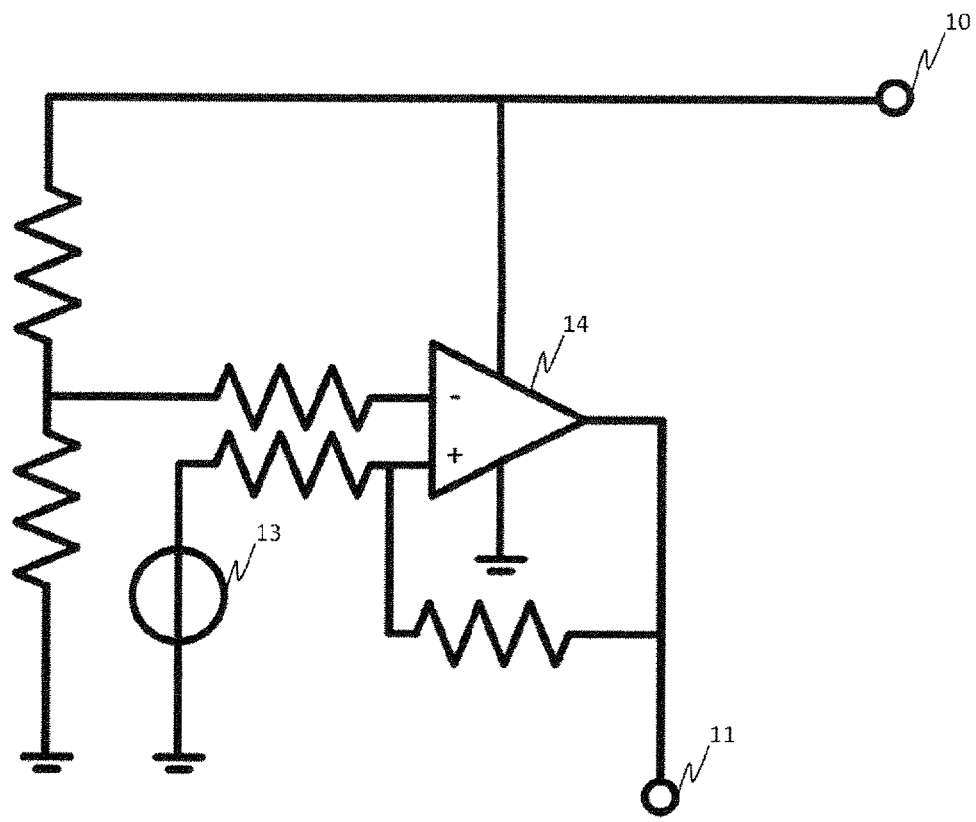
FIG. 2 a comparator circuit for switching a voltage conversion unit.

FIG. 2 shows a comparator circuit, which switches the voltage conversion unit on and off according to a voltage hysteresis. The comparator circuit has an input (10) and an output (11). The input is electrically parallel to the tap (6), i.e. the potential U_n lies between the input (10) and ground.

The output (11) is substantially formed by the output of an operational amplifier (14) and led to an ASIC of the voltage conversion unit. If the output of the operational amplifier is applied to a voltage signal, the ASIC activates the voltage conversion unit. If the output (11) is de-energized, the ASIC deactivates the voltage conversion unit. The operational amplifier compares the voltage at the input (11) with a voltage of a reference voltage source (13), which can be formed by a Zener diode with a resistor. The dimensioning of the resistors of the comparator circuit in relation to the Zener diode means that the voltage conversion unit is activated in the event that the voltage at the input (10) is below a first voltage threshold and deactivated in the event that the voltage at the input (10) is above a second voltage threshold. Here, the first voltage threshold is selected to be approximately 13 volts and the second voltage threshold approximately 14.4 volts.

According to an alternative embodiment, the comparator circuit and/or the ASIC can also be replaced by a microcontroller which is assigned to the voltage conversion unit. The microcontroller can integrate the function of the comparator circuit and the ASIC.

The threshold value circuit thus acts as a hysteresis circuit, as the voltage conversion unit leads to a charging current, i.e. to a recharge of the low-voltage battery, in the case of a voltage drop at the low-voltage battery below 13 volts, which is deactivated at a voltage of 14.4 volts, i.e. when the low-voltage battery receives no current and the voltage conversion unit maintains 14.4 volts on the output side. Thus, the low-voltage store (3) can be cyclically recharged in an idling state of the vehicle. In this way, an idling current occurring during the idling state of the vehicle is effectively compensated. It is hereby assumed that the low-voltage store is a store with high current consumption, i.e. a power-optimized store. In addition to the supercapacitor mentioned by way of example, according to a further embodiment a lithium-ion battery, for instance, also comes into consideration.

In addition to recharging of the low-voltage battery in an idling state of the vehicle, i.e. when the vehicle is non-operationally positioned (for instance, parked in a garage), a consumer (9), which is connected in parallel with the low-voltage battery, can also be provided with electrical power via the voltage conversion unit while the vehicle is charged or is in stationary operation (for instance, listening to the radio in a state without tractive demands). Thus, consumers of the nominal voltage level of the store (3), such as control units for controlling charging, water pumps for cooling, can be supplied during charging operation of the high-voltage battery without activation of the DC-DC converter. The charging current l_comp then serves to directly supply these components.

In stationary operation, the consumers of the nominal voltage level of the store (3), such as light modules for functions such as hazard lights, running lights or parking lights, or entertainment components such as a radio or music playback devices, can be supplied.

It is advantageous in the architecture shown in FIG. 1 that the voltage conversion unit is designed such that it is operated in an energetically optimal, i.e. energy efficient, operating state when the comparator circuit activates the voltage conversion unit.

The idling current compensation as well as the consumers of the nominal voltage level of the store (3) identified by way of example enable a dimensioning of the voltage conversion unit of a maximum of about 100 watts. For idling currents in modern vehicles of approximately 10-30 milliamps and for a consumption of power of approximately 80 watts (for example, listening to the radio), this results during cyclical on- and off-switching in an optimal utilization of the voltage conversion unit. A degree of electrical efficiency of more than 90% can thereby be achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having an electrical system, which electrical system comprises a first partial electrical system having a first energy store of a first nominal voltage level, a second partial electrical system having a second energy store of a second nominal voltage level, and a DC-DC converter between the two partial electrical systems, wherein
   the first energy store comprises a housing,
   the housing has a first tap for the first nominal voltage level, by which the DC-DC converter can be electrically supplied,
   the housing has a second tap for the second nominal voltage level, by which the second energy store can be electrically supplied,
   the first tap and the second tap are galvanically isolated,
   the housing includes a voltage conversion unit,
   the voltage conversion unit is configured to convert the electrical voltage of the first nominal voltage level to electrical voltage of the second nominal voltage level,
   the second tap is assigned a comparator circuit,
   a switch-on signal can be transmitted to the voltage conversion unit via the comparator circuit, and
   a switch-off signal can be transmitted to the voltage conversion unit via the comparator circuit.

2. The vehicle according to claim 1, wherein
   the housing includes at least one contactor contact, through which a first contactor position can be occupied and a second contactor position can be occupied,
   in the first contactor position, the first tap can be switched in a de-energized state,
   in the second contactor position, an electrical voltage drops across the first tap,
   an electrical voltage can be applied by the voltage conversion unit in the first contactor position across the second tap, and
   an electrical voltage can be applied by the voltage conversion unit in the second contactor position across the second tap.

3. The vehicle according to claim 2, wherein
   the second partial electrical system comprises electrical consumers of the second nominal voltage level, and
   the electrical consumers can be electrically supplied via the second tap.

4. The vehicle according to claim 2, wherein
   the comparator circuit is assigned a first switching voltage value,
   the comparator circuit is assigned a second switching voltage value, and
   a voltage dropping across the second tap can be compared with the first switching voltage value and with the second voltage switching value via the comparator circuit.

5. The vehicle according to claim 4, wherein
   via the comparator circuit, the switch-on signal can be transmitted across the second tap in the case of a dropping voltage which is lower than the first switching voltage value, and
   via the comparator circuit, the switch-off signal can be transmitted across the second tap in the case of a dropping voltage which exceeds the second switching voltage value.

6. The vehicle according to claim 2, wherein the comparator circuit comprises a microcontroller.

7. The vehicle according to claim 1, wherein
   the second partial electrical system comprises electrical consumers of the second nominal voltage level, and the electrical consumers can be electrically supplied via the second tap.

8. The vehicle according to claim 7, wherein
the comparator circuit is assigned a first switching voltage value,
the comparator circuit is assigned a second switching voltage value, and
a voltage dropping across the second tap can be compared with the first switching voltage value and with the second voltage switching value via the comparator circuit.

9. The vehicle according to claim 8, wherein
via the comparator circuit, the switch-on signal can be transmitted across the second tap in the case of a dropping voltage which is lower than the first switching voltage value, and
via the comparator circuit, the switch-off signal can be transmitted across the second tap in the case of a dropping voltage which exceeds the second switching voltage value.

10. The vehicle according to claim 7, wherein the comparator circuit comprises a microcontroller.

11. The vehicle according to claim 1, wherein
the comparator circuit is assigned a first switching voltage value,
the comparator circuit is assigned a second switching voltage value, and
a voltage dropping across the second tap can be compared with the first switching voltage value and with the second voltage switching value via the comparator circuit.

12. The vehicle according to claim 11, wherein
via the comparator circuit, the switch-on signal can be transmitted across the second tap in the case of a dropping voltage which is lower than the first switching voltage value, and
via the comparator circuit, the switch-off signal can be transmitted across the second tap in the case of a dropping voltage which exceeds the second switching voltage value.

13. The vehicle according to claim 12, wherein the comparator circuit comprises a microcontroller.

14. The vehicle according to claim 11, wherein the comparator circuit comprises a microcontroller.

15. The vehicle according to claim 1, wherein
the first nominal voltage level is in a voltage range of 24 volts to 600 volts, and
the second nominal voltage level is in a voltage range of 12 volts to 60 volts.

16. The vehicle according to claim 1, wherein the second energy store is designed as a power-optimized energy store.

17. The vehicle according to claim 1, wherein
the voltage conversion unit has a nominal output power, and
the nominal output power substantially corresponds to a typical power requirement of the second partial electrical system in a stationary operation of the vehicle.

18. The vehicle according to claim 1, wherein the comparator circuit comprises a microcontroller.

* * * * *